United States Patent
Triantos et al.

(10) Patent No.: US 9,391,496 B2
(45) Date of Patent: Jul. 12, 2016

(54) TRANSMISSION FOR A VEHICLE

(71) Applicant: GM GLOBAL TECHNOLOGY OPERATIONS LLC, Detroit, MI (US)

(72) Inventors: Konstantinos Triantos, Huntington Beach, CA (US); John A. Diemer, Farmington Hills, MI (US); Pete R. Garcia, Troy, MI (US); Kent A. Miller, Pinckney, MI (US); Anthony P. Tata, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 730 days.

(21) Appl. No.: 13/744,974

(22) Filed: Jan. 18, 2013

(65) Prior Publication Data

US 2014/0203676 A1    Jul. 24, 2014

(51) Int. Cl.
| | |
|---|---|
| *H02K 13/00* | (2006.01) |
| *H02K 3/50* | (2006.01) |
| *H02K 5/22* | (2006.01) |
| *B60K 6/22* | (2007.10) |

(52) U.S. Cl.
CPC ...... *H02K 13/00* (2013.01); *B60K 6/22* (2013.01); *H02K 3/50* (2013.01); *H02K 5/225* (2013.01)

(58) Field of Classification Search
CPC .......... H02K 13/00; H02K 3/50; H02K 5/225
See application file for complete search history.

(56) References Cited

U.S. PATENT DOCUMENTS

| | | | | |
|---|---|---|---|---|
| 6,166,498 | A * | 12/2000 | Yamaguchi | B60K 6/28 180/65.235 |
| 6,533,696 | B1 * | 3/2003 | Takenaka | B60K 6/40 180/65.235 |
| 8,344,566 | B2 * | 1/2013 | Koshida | B60K 6/26 310/85 |
| 2013/0294040 | A1 | 11/2013 | Fukumasu et al. | |

FOREIGN PATENT DOCUMENTS

| | | |
|---|---|---|
| CN | 1800678 A | 7/2006 |
| DE | 19816699 A1 | 10/1998 |
| JP | 2004175261 A | 6/2004 |
| JP | 2009121553 A | 6/2009 |

* cited by examiner

*Primary Examiner* — Dang Le
(74) *Attorney, Agent, or Firm* — Quinn Law Group, PLLC

(57) ABSTRACT

A transmission for a vehicle is disclosed which includes a casing defining a first cavity and a second cavity inside the casing. A platform is at least partially disposed inside the casing to separate the first and second cavities. The platform defines a plurality of first apertures arranged together to define a first group. An interface assembly includes a first support and a plurality of first connectors attached to the first support to define a first bundle. The first support is selectively attached to the platform to position the first bundle relative to the platform such that each of the first connectors are disposed in respective ones of the first apertures of the first group. The first connectors are coupled to a power inverter module and a first motor/generator through the first apertures of the platform to electrically connect the power inverter module and the first motor/generator to each other.

19 Claims, 8 Drawing Sheets

TRANSMISSION FOR A VEHICLE

TECHNICAL FIELD

The present disclosure relates to a transmission for a vehicle.

BACKGROUND

Various transmissions have been developed for vehicles. One type of transmission is an electrically-variable transmission including two electric motor/generators, clutches, etc. Clutches allow one or more electrically-variable modes of operation, fixed speed ratio modes, and an electric-only (battery-powered) mode. An electric power inverter assembly is utilized to control the first and second electric motor/generators. Generally, the electric power inverter assembly is assembled remote from the electrically-variable transmission; therefore, assembly of the electric power inverter is labor intensive and additional brackets or supports are generally utilized to secure the electric power inverter assembly remote from the transmission. Furthermore, multiple rods are individually inserted and attached to the power inverter and the first and second motor/generators to connect the power inverter and the first and second motor/generators, which is time consuming and tedious.

SUMMARY

The present disclosure provides a transmission for a vehicle. The transmission includes a casing defining a first cavity and a second cavity inside the casing. The first and second cavities are spaced from each other. The transmission also includes a platform at least partially disposed inside the casing to separate the first and second cavities. The platform defines a plurality of first apertures arranged together to define a first group. The first apertures extend between the first and second cavities. The transmission also includes a first motor/generator disposed in the second cavity and a power inverter module disposed in the first cavity. The power inverter module is supported by the platform. The transmission further includes an interface assembly including a first support and a plurality of first connectors attached to the first support to define a first bundle. The first support is selectively attached to the platform to position the first bundle relative to the platform such that each of the first connectors are disposed in respective ones of the first apertures of the first group. The first connectors are coupled to the power inverter module and the first motor/generator through the first apertures of the platform to electrically connect the power inverter module and the first motor/generator to each other.

The present disclosure also provides a transmission for a vehicle. The transmission includes a casing defining a first cavity and a second cavity inside the casing. The first and second cavities are spaced from each other. The transmission also includes a platform at least partially disposed inside the casing to separate the first and second cavities. The platform defines a plurality of first apertures arranged together to define a first group. The first apertures extend between the first and second cavities. The platform defines a plurality of second apertures arranged together to define a second group spaced from the first group. The second apertures also extend between the first and second cavities. The transmission also includes a first motor/generator and a second motor/generator each disposed in the second cavity. Furthermore, the transmission includes a power inverter module disposed in the first cavity and supported by the platform. The transmission further includes an interface assembly including a first support and a plurality of first connectors attached to the first support to define a first bundle. The first support is selectively attached to the platform to position the first bundle relative to the platform such that each of the first connectors are disposed in respective ones of the first apertures of the first group. The first connectors are coupled to the power inverter module and the first motor/generator through the first apertures of the platform to electrically connect the power inverter module and the first motor/generator to each other. The interface assembly also includes a plurality of first strips spaced from each other. Each of the first strips extend from the power inverter module and engage respective first connectors such that the first bundle couples together the power inverter module and the first motor/generator through the first apertures and the first strips. The first motor/generator includes a first terminal engaging the first connectors to electrically connect the first motor/generator to the power inverter module through the first terminal, the first connectors and the first strips. The interface assembly further includes a second support and a plurality of second connectors attached to the second support to define a second bundle. The second support is selectively attached to the platform to position the second bundle relative to the platform such that each of the second connectors are disposed in respective ones of the second apertures of the second group. The second connectors are coupled to the power inverter module and the second motor/generator through the second apertures of the platform to electrically connect the power inverter module and the second motor/generator to each other. In addition, the interface assembly includes a plurality of second strips spaced from each other and spaced from the first strips. Each of the second strips are extending from the power inverter module and engage respective second connectors such that the second bundle couples together the power inverter module and the second motor/generator through the second apertures and the second strips. The second motor/generator includes a second terminal engaging the second connectors to electrically connect the second motor/generator to the power inverter module through the second terminal, the second connectors and the second strips.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
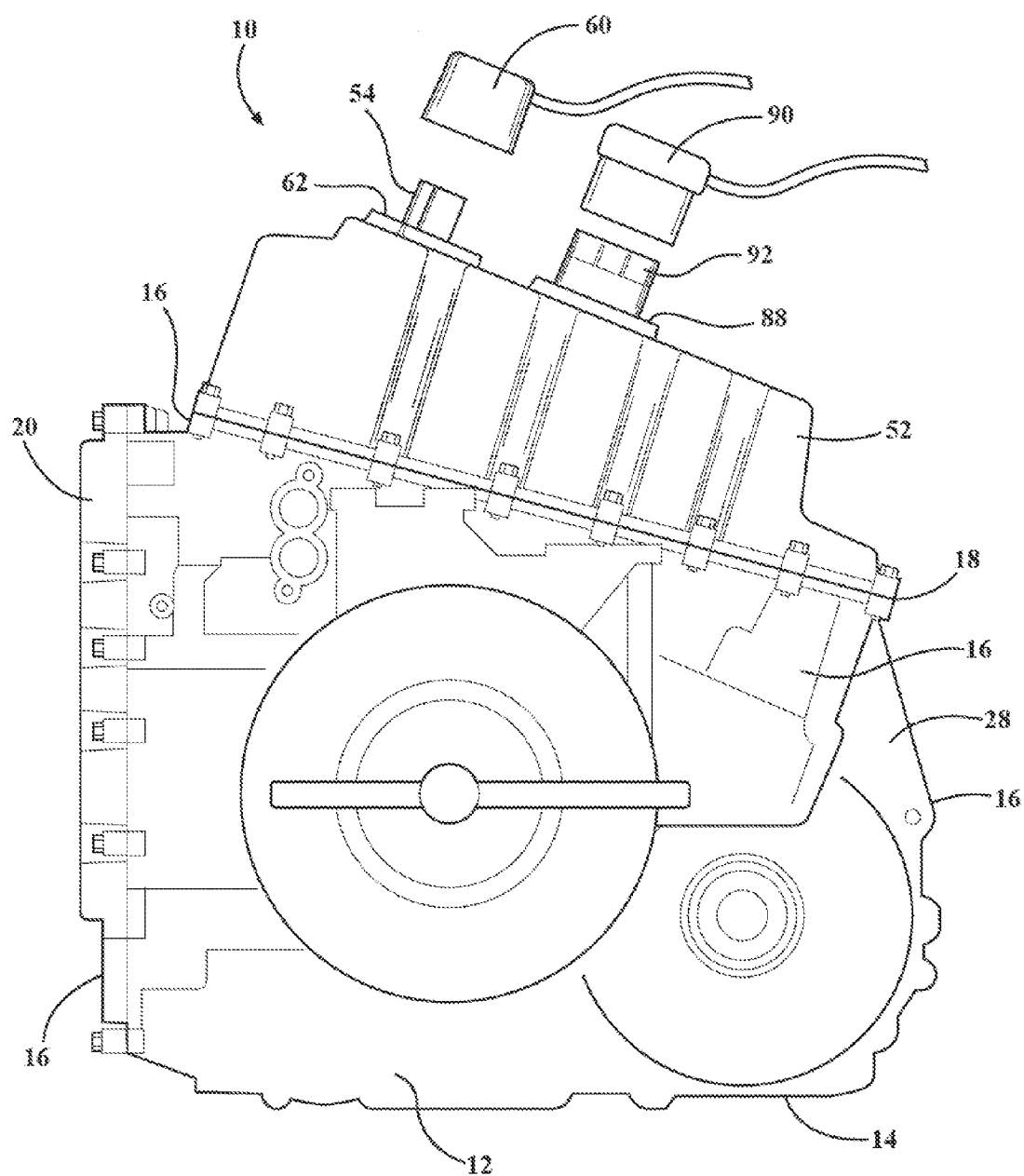
FIG. 1 is a schematic side view of a transmission with a first cable harness and a wire harness exploded from the transmission.

Referring to the Figures, wherein like numerals indicate like or corresponding parts throughout the several views, a transmission 10 for a vehicle is generally shown in FIG. 1. The transmission 10 can be an electrically-variable transmission 10 as discussed further below or any other suitable transmission 10. Therefore, the transmission 10 discussed herein can be for a hybrid vehicle or any other suitable vehicle.

Figure 2:
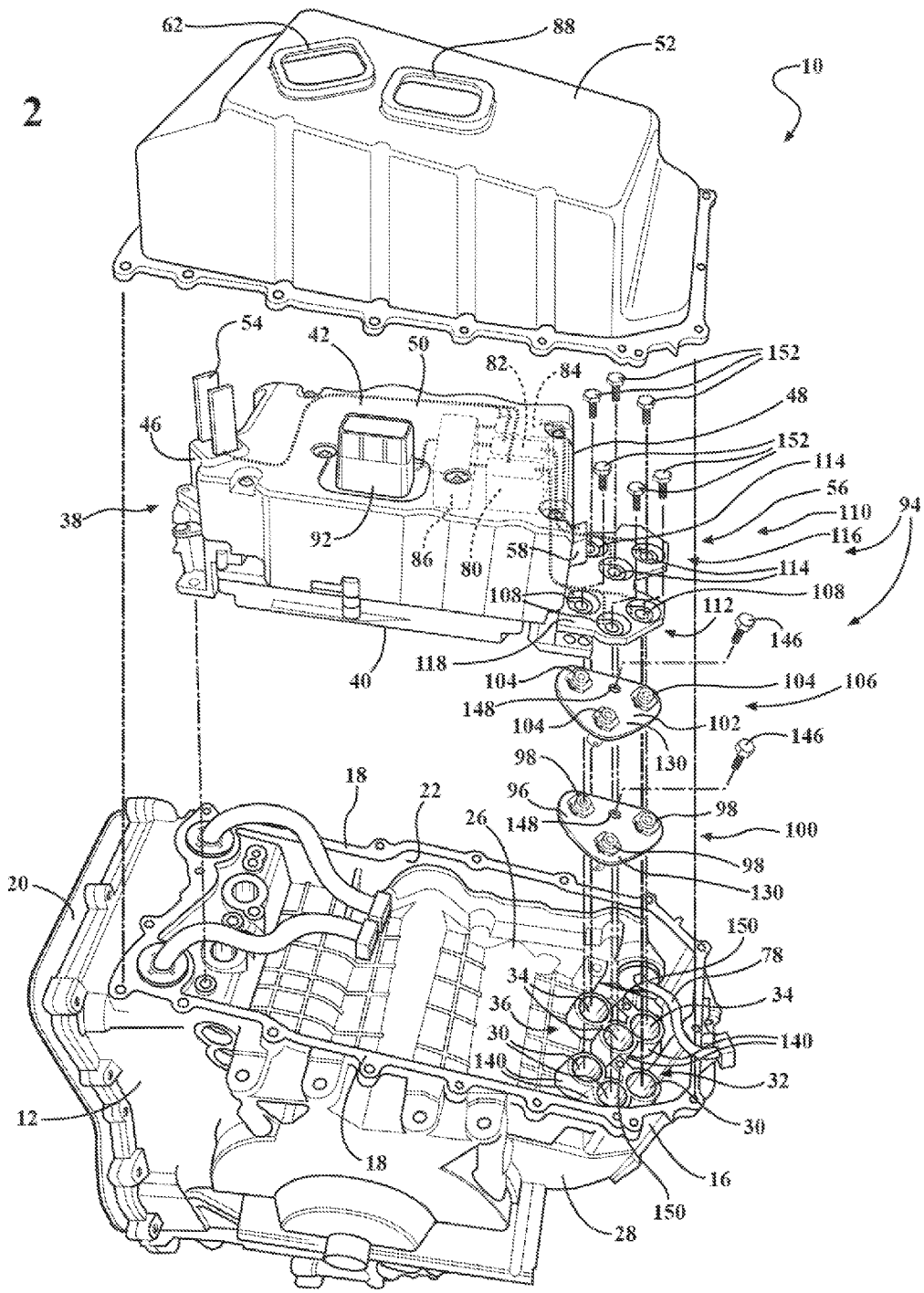
FIG. 2 is a schematic partially exploded perspective view of the transmission.
Figure 3:
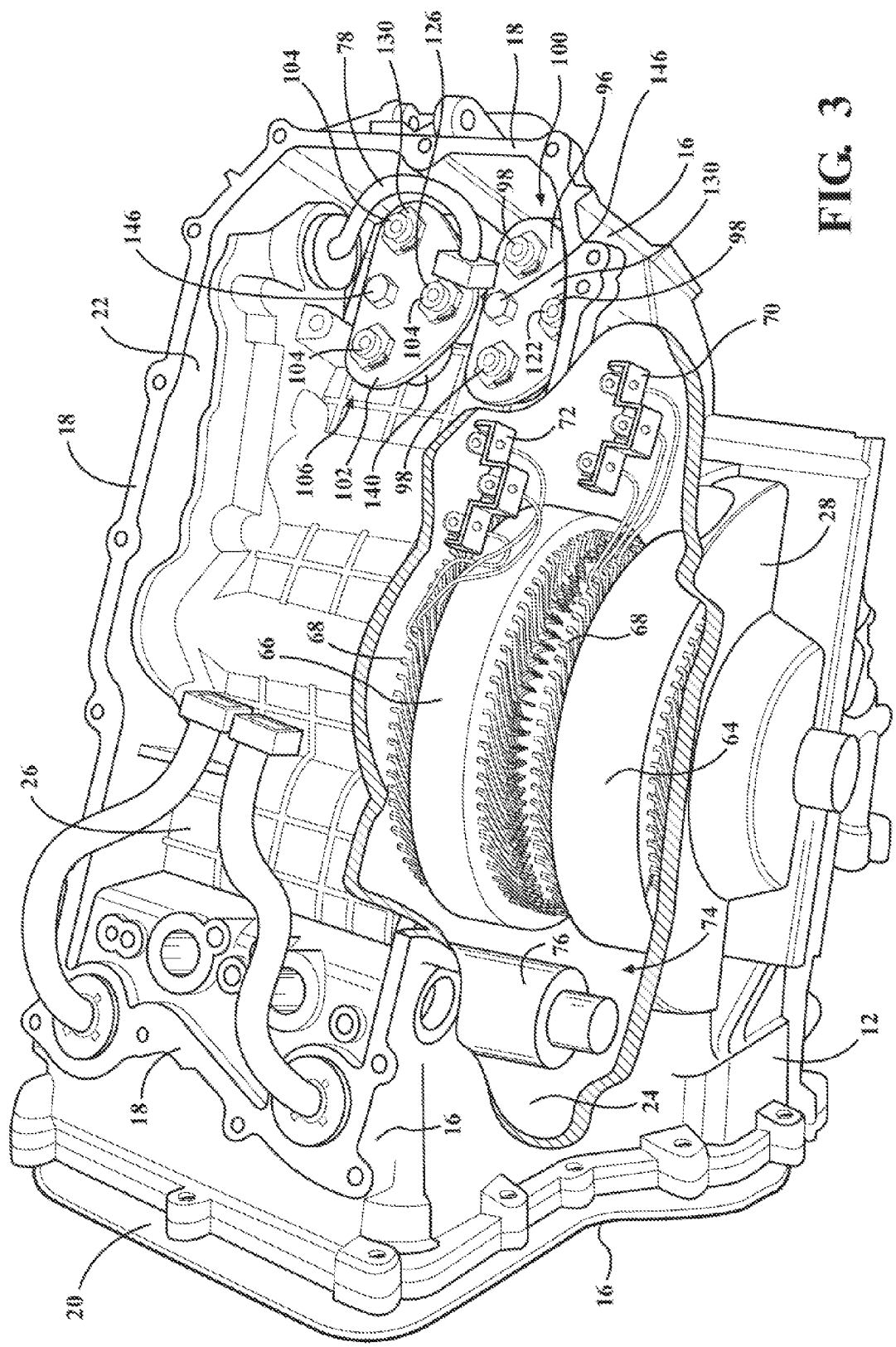
FIG. 3 is a schematic perspective broken view of a casing with a pump, a first motor/generator and a second motor/generator each disposed in a second cavity.

The transmission 10 includes a casing 12 as best shown in FIGS. 1-3. The casing 12 includes a base 14 and a plurality of walls 16 extending outwardly away from the base 14 to a distal edge 18. In certain embodiments, one or more walls 16 are integrally formed to the base 14. In other words, one or more walls 16 and the base 14 can be formed of one piece. Furthermore, in certain embodiments, a segment 20 of at least one of the walls 16 can be detachable from the other walls 16.

Referring to FIGS. 2 and 3, the casing 12 defines a first cavity 22 and a second cavity 24 inside the casing 12. More specifically, the casing 12 defines the first and second cavities 22, 24 between the walls 16. Generally, the first cavity 22 is disposed adjacent to the distal edge 18 of each of the walls 16. The first cavity 22 can be selectively open to outside of the casing 12. Furthermore, the first and second cavities 22, 24 are spaced from each other.

As best shown in FIGS. 2 and 3, in addition, the transmission 10 includes a platform 26 at least partially disposed inside the casing 12 to separate the first and second cavities 22, 24. Therefore, generally, at least a portion of the platform 26 is disposed inside the casing 12. Furthermore, the platform 26 is disposed between the walls 16 to separate the first and second cavities 22, 24. As such, in certain embodiments, the platform 26 and the first and second cavities 22, 24 are disposed between the walls 16.

The casing 12, and more specifically, the walls 16 can include an exterior 28 disposed outside of the casing 12. The first cavity 22 is generally disposed adjacent to the distal edge 18 of each of the walls 16 such that the first cavity 22 is selectively open to the exterior 28 of the walls 16 and the second cavity 24 is substantially closed to the exterior 28 of the walls 16. Simply stated, the first cavity 22 is selectively open to outside of the casing 12, and more specifically, open to the exterior 28 of the casing 12. Specifically, in certain embodiments, the first cavity 22 is disposed above the second cavity 24 such that the platform 26 and the walls 16 cooperate to substantially close the second cavity 24.

The first cavity 22 is configured for receiving a gaseous fluid to define a dry interior. In certain embodiments, the gaseous fluid in the first cavity 22 is air. It is to be appreciated that other gaseous fluids can be disposed in the first cavity 22.

Furthermore, the second cavity 24 is configured for receiving a liquid fluid to define a wet interior. In certain embodiments, the liquid fluid in the second cavity 24 is transmission fluid. Therefore, in certain embodiments, the second cavity 24 is configured for receiving transmission fluid to define the wet interior. For example, the transmission fluid can be automatic transmission fluid (ATF). It is to be appreciated that other liquid fluids can be disposed in the second cavity 24.

The first cavity 22 is generally disposed above the second cavity 24 for maintaining the liquid fluid in the second cavity 24 such that the first cavity 22 defines the dry interior. In other words, the first cavity 22 is generally disposed above the second cavity 24 for maintaining the transmission fluid in the second cavity 24. More specifically, the first cavity 22 is generally disposed above the second cavity 24 for maintaining the transmission fluid in the second cavity 24 such that the first cavity 22 defines the dry interior. Furthermore, the platform 26 separates the first and second cavities 22, 24 to assist in maintaining the liquid fluid in the second cavity 24.

Turning to FIG. 2, the platform 26 defines a plurality of first apertures 30 arranged together to define a first group 32. Generally, the first apertures 30 extend between the first and second cavities 22, 24. In certain embodiments, the platform 26 can define a plurality of second apertures 34 arranged together to define a second group 36 spaced from the first group 32. Generally, the second apertures 34 extend between the first and second cavities 22, 24. As one example, FIG. 2 illustrates the first group 32 including a cluster of three first apertures 30 and the second group 36 including a cluster of three second apertures 34. It is to be appreciated that any suitable number of first apertures 30 can define the first group 32 and any suitable number of second apertures 34 can define the second group 36.

Figure 4:
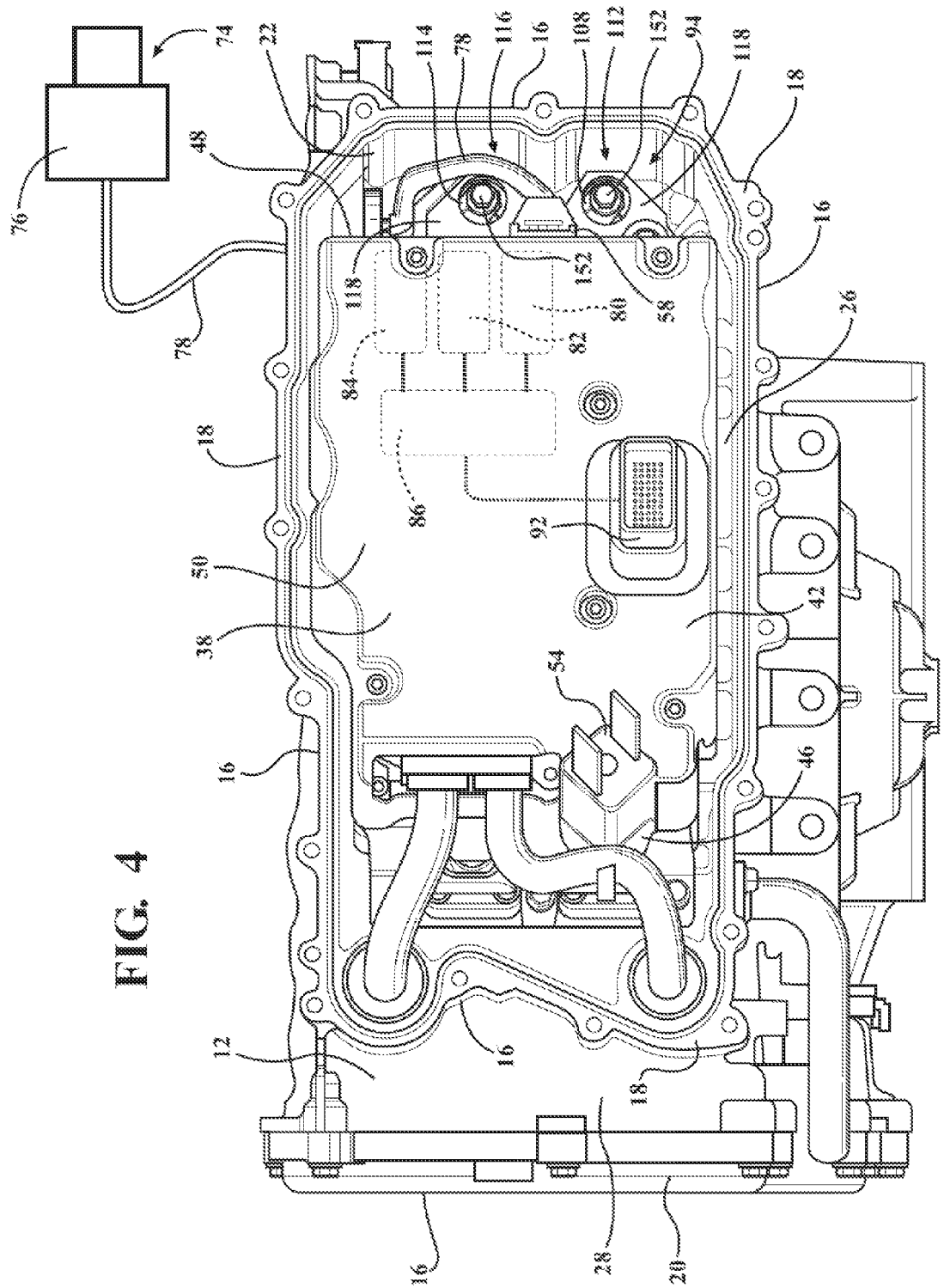
FIG. 4 is a schematic top perspective view of a power inverter module disposed in a first cavity with a lid removed.

Turning to FIGS. 2 and 4, the transmission 10 further includes a power inverter module 38 disposed in the first cavity 22 and supported by the platform 26. Specifically, the power inverter module 38 can be selectively disposed in the first cavity 22. It is to be appreciated that the power inverter module 38 can also be referred to as a traction power inverter module (TPIM).

Continuing with FIGS. 2 and 4, the power inverter module 38 can define a self-contained unit selectively disposed in the first cavity 22. Generally, the self-contained unit is supported by the platform 26 when in the first cavity 22. Packaging the power inverter module 38 as the self-contained unit provides a compact design, as well as provides easy assembly of the power inverter module 38 to the transmission 10 and easy disassembly of the power inverter module 38 from the transmission 10. Therefore, the power inverter module 38 is self-contained to be dropped into the first cavity 22 as a unit and integrated into the transmission 10, thus simplifying assembly. Furthermore, the power inverter module 38 is self-contained to allow easy replacement of the power inverter module 38 with another power inverter module 38. In addition, the power inverter module 38 is disposed in the first cavity 22 which defines the dry interior to separate the power inverter module 38 from the liquid fluid in the second cavity 24.

Figure 5:
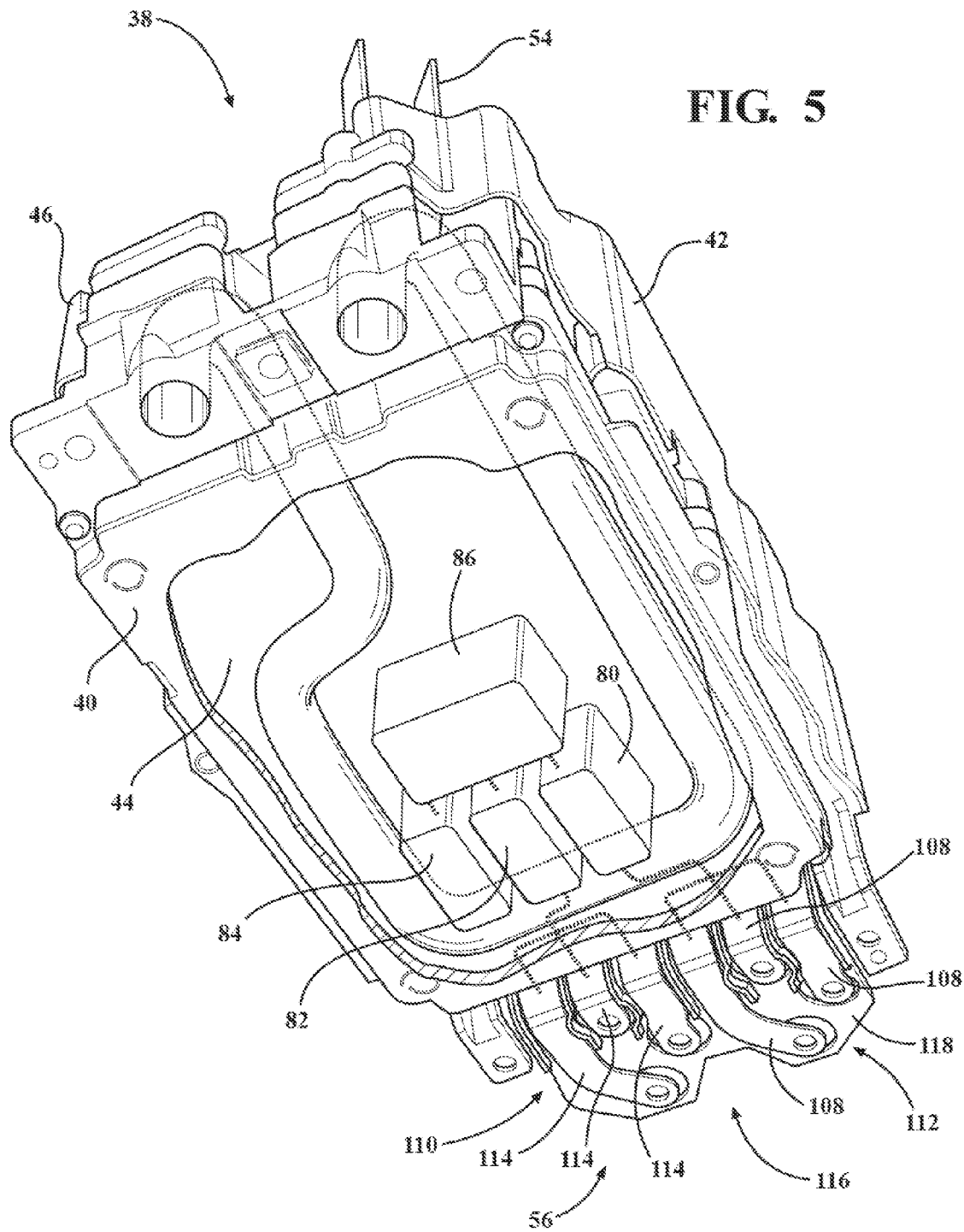
FIG. 5 is a schematic bottom perspective broken view of the power inverter module.

Referring to FIGS. 2 and 5, in certain embodiments, the power inverter module 38 can include a bottom 40 selectively coupled to the platform 26 and a cover 42 coupled to the bottom 40. The bottom 40 and the cover 42 cooperate to further define the self-contained unit. In other words, the base 14 and the cover 42 cooperate to define a hollow 44 therein, with various components of the power inverter module 38 disposed in the hollow 44, some of which are discussed further below.

The bottom 40 of the power inverter module 38 can be coupled or attached to the platform 26 to secure the power inverter module 38 to the platform 26, and more specifically, to position the power inverter module 38 relative to the walls 16 in the first cavity 22. Therefore, uncoupling or detaching the bottom 40 of the power inverter module 38 from the platform 26 allows the self-contained unit to be easily removed and replaced by another power inverter module 38.

Turning to FIG. 2, the cover 42 of the power inverter module 38 can include a front side 46 and a rear side 48 opposing the front side 46. The cover 42 can also include a top side 50 disposed between the front and rear sides 46, 48 and opposing the bottom 40 of the power inverter module 38.

Turning to FIGS. 1 and 2, the transmission 10 can also include a lid 52 attached to the casing 12 to contain the power inverter module 38 inside the first cavity 22. More specifically, the lid 52 can be attached to the distal edge 18 of each of the walls 16. The lid 52 is movable between a first position attached to the distal edge 18 of each of the walls 16 for containing the power inverter module 38 in the first cavity 22 of the casing 12 and a second position detached from the distal edge 18 of each of the walls 16 for removing the power inverter module 38 from the first cavity 22 of the casing 12 as the self-contained unit. Therefore, generally, the lid 52 is disposed in the first position when attached to the casing 12 and the lid 52 is disposed in the second position when detached from the casing 12. The lid 52 is shown in the first position in FIG. 1 and the lid 52 is shown in the second position in FIG. 2.

When the lid 52 is in the first position, the power inverter module 38 can be closed or sealed in the first cavity 22 such that the first cavity 22 remains dry to define the dry interior. It is to be appreciated that any suitable seal, gasket, etc. can be disposed between the distal edge 18 of each of the walls 16 and the lid 52 to assist in closing or sealing the first cavity 22 when the lid 52 is in the first position. Therefore, engagement between the lid 52 and the distal edge 18 of each of the walls 16 minimizes fluids, particles, etc. from entering the first cavity 22 from outside the casing 12.

Generally, the power inverter module 38 is configured for providing electrical energy to various components, some of which are discussed further below. Specifically, the power inverter module 38 is configured for converting direct current energy into alternating current energy. Therefore, the power inverter module 38 converts direct current energy into alternating current energy for various components, some of which are discussed further below.

As best shown in FIGS. 2 and 4, the power inverter module 38 can include a first junction 54 for receiving the direct current energy into the self-contained unit. Furthermore, the power inverter module 38 can include a second junction 56 and a third junction 58 each for outputting the alternating current energy from the self-contained unit. Generally, the first, second and third junctions 54, 56, 58 are spaced from each other. At least one of the first, second and third junctions 54, 56, 58 extend from one of the rear and top sides 48, 50. Specifically, in certain embodiments, the first junction 54 extends from the top side 50 and the second and third junctions 56, 58 extend from the rear side 48. It is to be appreciated that the first, second and third junctions 54, 56, 58 can extend from any suitable side, including the front, rear and top sides 46, 48, 50 as discussed above, of the power inverter module 38.

Generally, a first cable harness 60 (see FIG. 1) is coupled to the first junction 54 for delivering or supplying the direct current energy into the power inverter module 38. Therefore, the direct current energy from the first cable harness 60 is delivered into the power inverter module 38 through the first junction 54 and converted into the alternating current energy which exits the power inverter module 38 through the second and third junctions 56, 58. In other words, the alternating current energy is outputted from the power inverter module 38 through the second and third junctions 56, 58.

In certain embodiments, the lid 52 defines a first opening 62 (see FIG. 2) cooperating with the first junction 54 such that the first cable harness 60 can engage the first junction 54. Specifically, the first cable harness 60 generally closes or seals the lid 52 about the first opening 62 to minimize fluids, particles, etc. from entering the first cavity 22 from outside of the lid 52. It is to be appreciated that other components can be utilized to close or seal the lid 52 about the first opening 62, such as, for example, seals, gaskets, caps, etc.

Turning to FIG. 3, the transmission 10 also includes a first motor/generator 64 disposed in the second cavity 24. In certain embodiments, the transmission 10 can also include a second motor/generator 66 disposed in the second cavity 24. Therefore, the first and second motor/generators 64, 66 are each disposed in the second cavity 24. Generally, the first and second motor/generators 64, 66 are each electrically connected to the second junction 56 of the power inverter module 38 such that the alternating current energy is delivered or supplied to the first and second motor/generators 64, 66. Therefore, the direct current energy from the first cable harness 60 is delivered into the power inverter module 38 through the first junction 54 and converted into the alternating current energy which exits the power inverter module 38 through the second junction 56 such that the alternating current energy is delivered to the first and second motor/generators 64, 66. It is to be appreciated that the first and second motor/generators 64, 66 are shown schematically in FIG. 3 for illustrative purposes and the configuration/location of the first and second motor/generators 64, 66 can change.

Generally, the first and second motor/generators 64, 66 can each include a rotor and a stator 68 (see FIG. 3). In various embodiments, the first and/or second motor/generators 64, 66 can be referred to as traction motors. Continuing with FIGS. 3 and 6, the first motor/generator 64 includes a first terminal 70. Furthermore, the first terminal 70 is coupled to the stator 68 of the first motor/generator 64 to electrically connect the stator 68 of the first motor/generator 64 and the power inverter module 38 to each other. In addition, referring to FIGS. 3 and 7, the second motor/generator 66 includes a second terminal 72. The second terminal 72 is coupled to the stator 68 of the second motor/generator 66 to electrically connect the stator 68 of the second motor/generator 66 and the power inverter module 38 to each other. The first and second terminals 70, 72 are shown in phantom lines in FIGS. 6 and 7 respectively for illustrative purposes only.

Generally, the electrically-variable transmission 10 can include the first and second motor/generators 64, 66 as discussed above. As implied above, the electrically-variable transmission 10 can be utilized in hybrid vehicles. Therefore, the power inverter module 38 is utilized to supply the alternating current energy to the first and second motor/generators 64, 66, as well as to control the first and second motor/generators 64, 66 as discussed further below. It is to be appreciated that the transmission 10 can include other components not specifically discussed herein. It is to also be appreciated that the transmission 10 can be utilized for vehicles other than hybrid vehicles as also discussed above.

Furthermore, in certain embodiments, the transmission 10 can further include a pump 74 electrically connected to third junction 58 of the power inverter module 38 such that the alternating current energy is delivered or supplied to the pump 74. In one embodiment, the pump 74 can be disposed in the second cavity 24 of the transmission 10 (see FIG. 3). Turning to FIGS. 3 and 4, the pump 74 can include a motor 76 electrically connected to the third junction 58 of the power inverter module 38 such that the alternating current energy is delivered or supplied to the motor 76 of the pump 74. More specifically, the direct current energy from the first cable harness 60 is delivered into the power inverter module 38 through the first junction 54 and converted into the alternating current energy which exits the power inverter module 38 through the third junction 58 such that the alternating current energy is delivered to the pump 74, and specifically, to the motor 76 of the pump 74. A second cable harness 78 (see FIG. 4) can be coupled to the third junction 58 and the motor 76 of the pump 74 to deliver the alternating current energy from the power inverter module 38 to the pump 74. It is to be appreciated that the pump 74 is shown schematically in FIGS. 3 and 4 for illustrative purposes only and the configuration/location of the pump 74 can change.

Turning to FIGS. 2, 4, 5 and 8, the power inverter module 38 can include a first inverter 80 electrically connected to the first motor/generator 64 for delivering or supplying alternating current energy to the first motor/generator 64. The power inverter module 38 can further include a second inverter 82 electrically connected to the second motor/generator 66 for delivering or supplying alternating current energy to the second motor/generator 66. Therefore, the direct current energy from the first cable harness 60 is converted into the alternating current energy in the first and second inverters 80, 82. As such, the first cable harness 60 is coupled to the first and second inverters 80, 82 through the first junction 54. Thus, the first and second inverters 80, 82 are electrically connected to the first junction 54. It is to be appreciated that the first and second inverters 80, 82 are shown schematically in the power inverter module 38 of FIGS. 2, 4 and 5 for illustrative purposes only and the configuration/location of the first and second inverters 80, 82 can change. It is to also be appreciated that some of the electrical connections are shown in FIGS. 2 and 5.

Continuing with FIGS. 2, 4, 5 and 8, in addition, the power inverter module 38 can include a third inverter 84 electrically connected to the motor 76 of the pump 74 for delivering or supplying alternating current energy to the motor 76 of the pump 74 through the third junction 58. Specifically, the alternating current energy is delivered to the motor 76 of the pump 74 through the third junction 58 and the second cable harness 78. Therefore, the direct current energy from the first cable harness 60 is converted into the alternating current energy in the third inverter 84. As such, the first cable harness 60 is coupled to the third inverter 84 through the first junction 54. Thus, the third inverter 84 is electrically connected to the first junction 54. It is to be appreciated that the third inverter 84 is shown schematically in the power inverter module 38 of FIGS. 2, 4 and 5 for illustrative purposes only and the configuration/location of the third inverter 84 can change. As discussed above, it is to also be appreciated that some of the electrical connections are shown in FIGS. 2 and 5.

Turning to FIGS. 2, 4, 5, 8 and 9, furthermore, the power inverter module 38 can include a controller 86 coupled to at least one of the first, second and third inverters 80, 82, 84 for controlling at least one of the motor 76 of the pump 74 and the first and second motor/generators 64, 66. In certain embodiments, the controller 86 is coupled to the first, second and third inverters 80, 82, 84 for controlling the first and second motor/generators 64, 66 and the motor 76 of the pump 74. In other words, the controller 86 is in communication with the first, second and third inverters 80, 82, 84. It is to be appreciated that the controller 86 is shown schematically in the power inverter module 38 of FIGS. 2, 4 and 5 for illustrative purposes only and the configuration/location of the controller 86 can change. It is to further be appreciated that more than one controller 86 can be disposed in the power inverter module 38. It is to also be appreciated that some of the connections are shown in FIGS. 4 and 5.

The controller 86 and the first, second and third inverters 80, 82, 84 are each disposed in the self-contained unit of the power inverter module 38 (see FIGS. 2, 4 and 5). In other words, the controller 86, and the first, second and third inverters 80, 82, 84 are each disposed in the hollow 44 of the power inverter module 38. As such, packaging of the controller 86 and the first, second and third power inverters 80, 82, 84 in the self-contained unit of the power inverter module 38 provides a compact design, as well as provides easy assembly of the power inverter module 38 to the transmission 10 and easy disassembly of the power inverter module 38 from the transmission 10. Therefore, the power inverter module 38 is self-contained to be integrated into the transmission 10, thus simplifying assembly. As such, the configuration of the casing 12 can be consistent or the same, and thus provide a universal casing 12 that can be used in multiple different vehicles.

Referring to FIG. 2, the lid 52 can also define a second opening 88 spaced from the first opening 62 such that a wire harness 90 (see FIG. 1) is electrically connected to at least one of the controller 86 and the first, second and third inverters 80, 82, 84. More specifically, the wire harness 90 connects the controller 86 to other vehicle systems such that the controller 86 can communicate with other vehicle systems.

A connection plug 92 (see FIGS. 1 and 2) can extend from the power inverter module 38 and cooperates with the second opening 88 and the wire harness 90 such that the wire harness 90 can engage the connection plug 92. Furthermore, the connection plug 92 and the controller 86 are in communication with each other (see FIGS. 2 and 9). Therefore, the wire harness 90 is coupled to the controller 86 through the connection plug 92 such that the wire harness 90 and the controller 86 are in communication with each other. In certain embodiments, the connection plug 92 extends from the top side 50 of the cover 42 of the power inverter module 38. Specifically, the wire harness 90 generally closes or seals the lid 52 about the second opening 88 to minimize fluids, particles, etc. from entering the first cavity 22 from outside of the lid 52. It is to be appreciated that other components can be utilized to close or seal the lid 52 about the second opening 88, such as, for example, seals, gaskets, caps, etc. It is to further be appreciated that the connection plug 92 can extend from any suitable side, including the front, rear and top sides 46, 48, 50 as discussed above, of the power inverter module 38. It is to also be appreciated that the first and second cable harnesses 60, 78 and the wire harness 90 are shown schematically for illustrative purposes.

The transmission 10 also includes an interface assembly 94. Generally, the interface assembly 94 electrically connects the power inverter module 38 to the first and second motor/generators 64, 66. More specifically, the first inverter 80 is electrically connected to the first motor/generator 64 for delivering or supplying alternating current energy to the first motor/generator 64 through the interface assembly 94, and additionally, the second inverter 82 is electrically connected to the second motor/generator 66 for delivering or supplying alternating current energy to the second motor/generator 66 through the interface assembly 94. In certain embodiments, the interface assembly 94 is disposed along the rear side 48 of the cover 42 and/or between the rear side 48 of the cover 42 and one of the walls 16. Furthermore, the interface assembly 94 includes the second junction 56.

Figure 6:
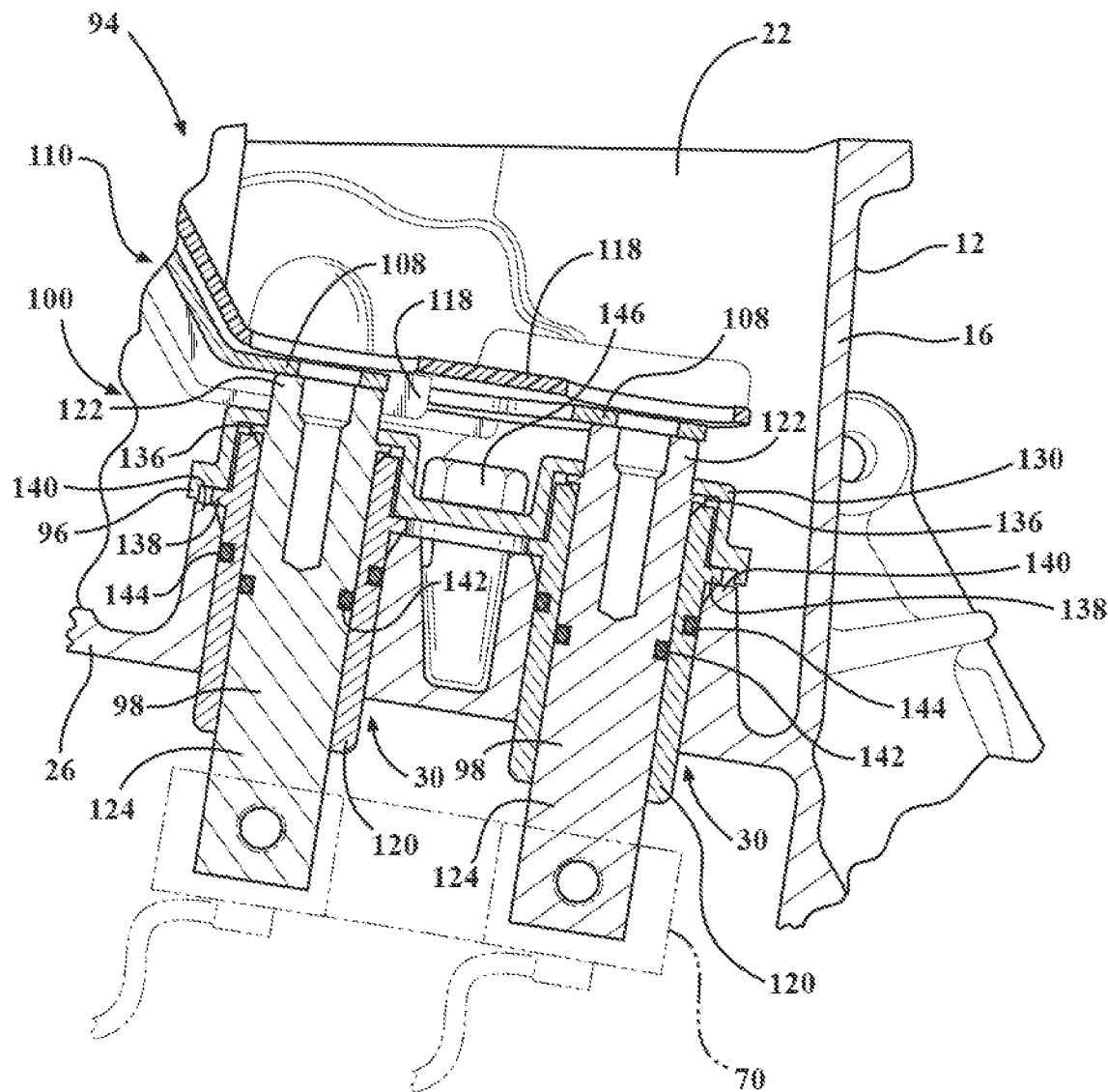
FIG. 6 is a schematic cross-sectional view of a platform, a first bundle, a plurality of first strips, and an insulator.

The interface assembly 94 includes a first support 96 and a plurality of first connectors 98 attached to the first support 96 to define a first bundle 100. The first support 96 is selectively attached to the platform 26 to position the first bundle 100 relative to the platform 26 such that each of the first connectors 98 are disposed in respective ones of the first apertures 30 of the first group 32. In other words, one of the first connectors 98 is disposed in one of the first apertures 30 and another one of the first connectors 98 is disposed in another one of the first apertures 30, etc. The first connectors 98 are coupled to the power inverter module 38 and the first motor/generator 64 through the first apertures 30 of the platform 26 to electrically connect the power inverter module 38 and the first motor/generator 64 to each other. Therefore, as shown in FIG. 6, part of the first bundle 100 is disposed in the first cavity 22 to couple to the power inverter module 38 and another part of the first bundle 100 is disposed in the second cavity 24 to couple to the first terminal 70 of the first motor/generator 64. It is to be appreciated that the first connectors 98 can be pins, posts, rods, etc. It is to further be appreciated that the first connectors 98 can be any suitable configuration. FIG. 3 illustrates the first terminal 70 uncoupled from the first bundle 100 for illustrative purposes only.

Figure 7:
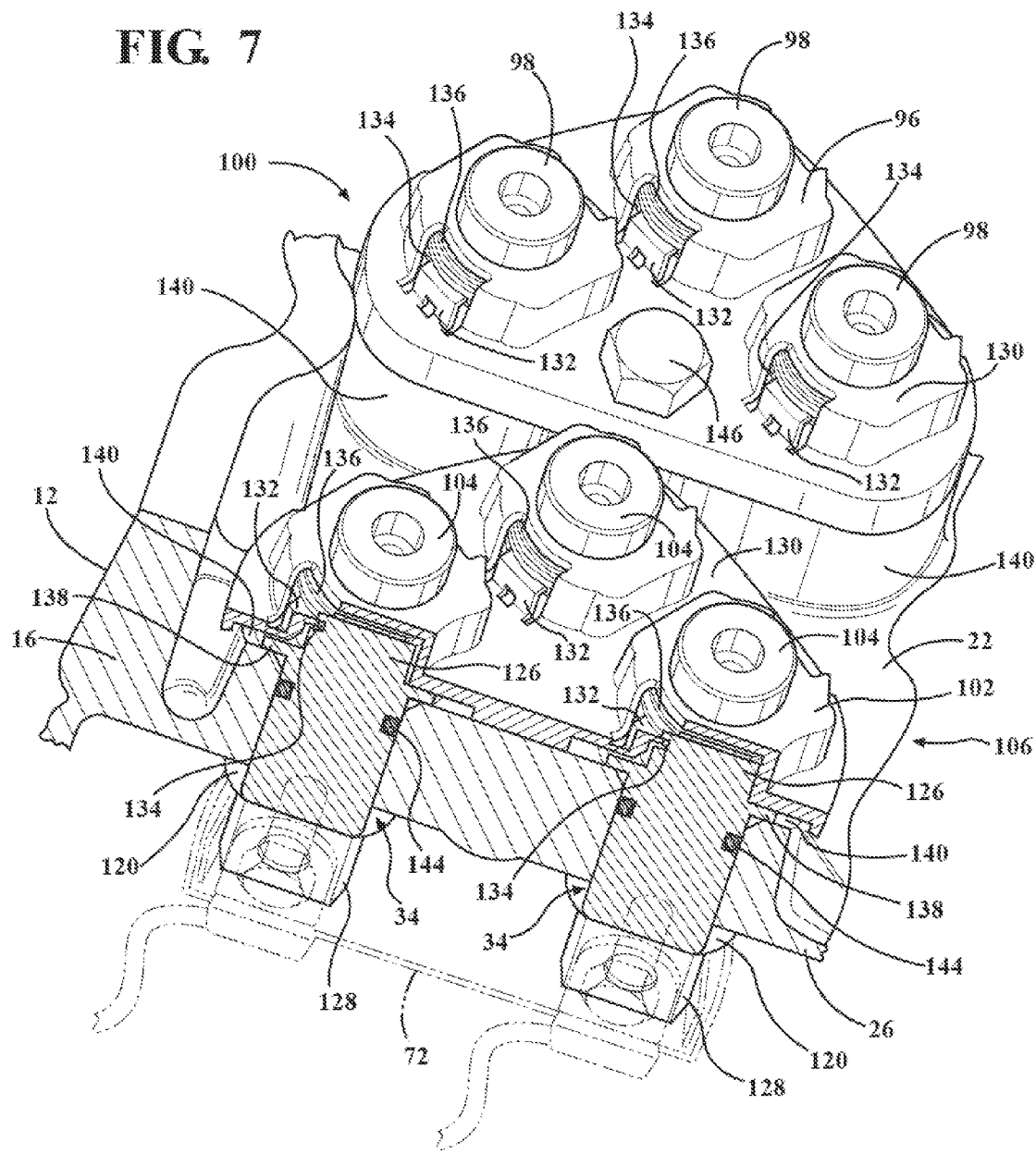
FIG. 7 is a schematic perspective cross-sectional view of the platform and a second bundle.
Figure 8:
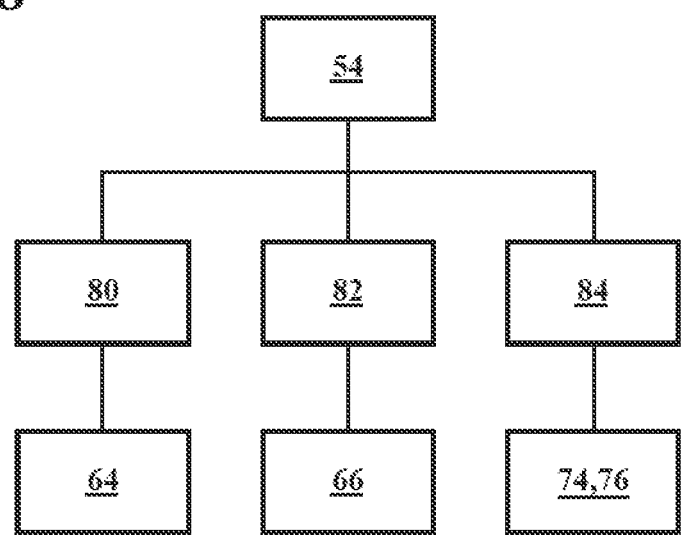
FIG. 8 is a schematic of a first junction in communication with a first inverter, a second inverter and a third inverter, with the first inverter in communication with the first motor/generator, and with the second inverter in communication with the second motor/generator, and with the third inverter in communication with a motor of the pump.
Figure 9:
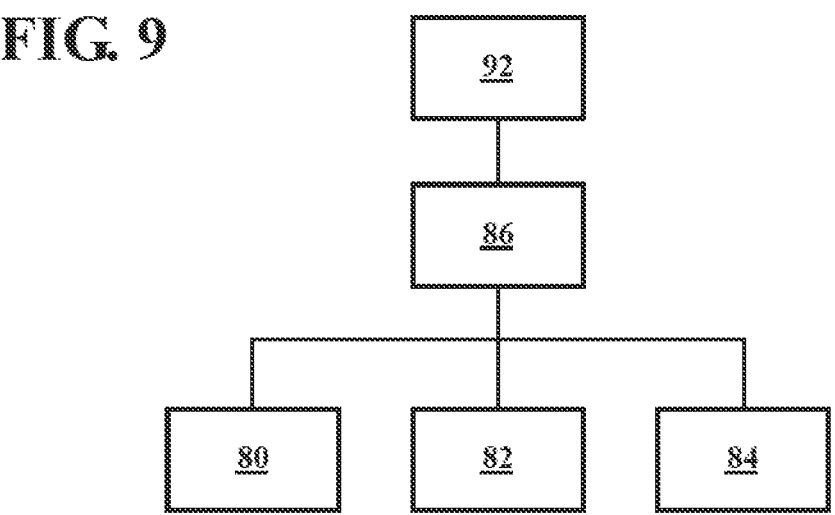
FIG. 9 is a schematic of a connection plug in communication with a controller, and with the controller in communication with the first, second and third inverters.

In certain embodiments, the interface assembly 94 can include a second support 102 and a plurality of second connectors 104 attached to the second support 102 to define a second bundle 106. The second support 102 is selectively attached to the platform 26 to position the second bundle 106 relative to the platform 26 such that each of the second connectors 104 are disposed in respective ones of the second apertures 34 of the second group 36. In other words, one of the second connectors 104 is disposed in one of the second apertures 34 and another one of the second connectors 104 is disposed in another one of the second apertures 34, etc. The second connectors 104 are coupled to the power inverter module 38 and the second motor/generator 66 through the second apertures 34 of the platform 26 to electrically connect the power inverter module 38 and the second motor/generator 66 to each other. Therefore, as shown in FIG. 7, part of the second bundle 106 is disposed in the first cavity 22 to couple to the power inverter module 38 and another part of the second bundle 106 is disposed in the second cavity 24 to couple to the second terminal 72 of the second motor/generator 66. It is to be appreciated that the second connectors 104 can be pins, posts, rods, etc. It is to further be appreciated that the second connectors 104 can be any suitable configuration. FIG. 3 illustrates the second terminal 72 uncoupled from the second bundle 106 for illustrative purposes only.

The first and second connectors 98, 104 can each be formed of a conductive material. The conductive material for the first and second connectors 98, 104 can be a metal material. One suitable metal material is steel. Another suitable metal material is aluminum. Yet another suitable metal material is copper. It is to be appreciated any suitable conductive material can be utilized for the first and second connectors 98, 104. Furthermore, it is to be appreciated that the first and second connectors 98, 104 can be formed of the same conductive material or different conductive materials.

Turning to FIGS. 2 and 5, in certain embodiments, the interface assembly 94 can include a plurality of first strips 108 spaced from each other. Each of the first strips 108 extend from the power inverter module 38 and engage respective first connectors 98 such that the first bundle 100 couples together the power inverter module 38 and the first motor/generator 64 through the first apertures 30 and the first strips 108. Therefore, the first strips 108 electrically connect the power inverter module 38 and the first motor/generator 64 together. Specifically, the first terminal 70 of the first motor/generator 64 engages the first connectors 98 to electrically connect the first motor/generator 64 to the power inverter module 38 through the first terminal 70, the first connectors 98 and the first strips 108.

Continuing with FIGS. 2 and 5, more specifically, the interface assembly 94 can further include a bus bar assembly 110 extending from the power inverter module 38. Generally, the bus bar assembly 110 electrically connects the power inverter module 38 and the first motor/generator 64 together. Furthermore, the bus bar assembly 110 can electrically connect the power inverter module 38 and the second motor/generator 66 together. Therefore, the bus bar assembly 110 can electrically connect both the first and second motor/generators 64, 66 to the power inverter module 38. In certain embodiments, the bus bar assembly 110 extends from the rear side 48 of the cover 42.

The bus bar assembly 110 can include a first connection portion 112 engaging the first bundle 100 to electrically connect the power inverter module 38 and the first motor/generator 64 to each other. In various embodiments, the first connection portion 112 can include the first strips 108 spaced from each other. Therefore, each of the first strips 108 extend from the power inverter module 38 and engage respective first connectors 98 such that the first bundle 100 couples together the power inverter module 38 and the first motor/generator 64 through the first apertures 30 and the first strips 108 of the bus bar assembly 110. As one example, FIG. 2 illustrates the first connection portion 112 including three first strips 108. It is to be appreciated that any suitable number of first strips 108 can be included in the first connection portion 112.

Turning to FIGS. 2 and 5, in certain embodiments, the interface assembly 94 can further include a plurality of second strips 114 spaced from each other and spaced from the first strips 108. Each of the second strips 114 extend from the power inverter module 38 and engage respective second connectors 104 such that the second bundle 106 couples together the power inverter module 38 and the second motor/generator 66 through the second apertures 34 and the second strips 114. Therefore, the second strips 114 electrically connect the power inverter module 38 and the second motor/generator 66 together. Specifically, the second terminal 72 of the second motor/generator 66 engages the second connectors 104 to electrically connect the second motor/generator 66 to the power inverter module 38 through the second terminal 72, the second connectors 104 and the second strips 114.

The bus bar assembly 110 can include a second connection portion 116 engaging the second bundle 106 to electrically connect the power inverter module 38 and the second motor/generator 66 to each other. In various embodiments, the second connection portion 116 can include the second strips 114 spaced from each other and spaced from the first strips 108. Therefore, each of the second strips 114 extend from the power inverter module 38 and engage respective second connectors 104 such that the second bundle 106 couples together the power inverter module 38 and the second motor/generator 66 through the second apertures 34 and the second strips 114 of the bus bar assembly 110. As one example, FIG. 2 illustrates the second connection portion 116 including three second strips 114. It is to be appreciated that any suitable number of second strips 114 can be included in the second connection portion 116.

The first and second strips 108, 114, thus the bus bar assembly 110 can each be formed of a conductive material. The conductive material for the first and second strips 108, 114, and thus the bus bar assembly 110, can be a metal material. One suitable metal material is steel. Another suitable metal material is aluminum. Yet another suitable metal material is copper. It is to be appreciated any suitable conductive material can be utilized for the first and second strips 108, 114, and thus the bus bar assembly 110. Furthermore, it is to be appreciated that the first and second strips 108, 114, and thus the bus bar assembly 110, can be formed of the same conductive material or different conductive materials.

As best shown in FIG. 2, in certain embodiments, the interface assembly 94 can include an insulator 118 adjacent to the bus bar assembly 110 to isolate each of the first and second strips 108, 114 from each other. In other words, the insulator 118 insulates each of the first and second strips 108, 114 such that electricity does not bridge over to another strip 108, 114. In various embodiments, the insulator 118 can extend from the rear side 48 of the cover 42. Furthermore, the second junction 56 includes the bus bar assembly 110 and the insulator 118.

Generally, the insulator 118 is formed of a non-conductive material, such as a polymeric material. One suitable polymeric material is plastic. It is to be appreciated that any suitable non-conductive material can be utilized for the insulator 118. Furthermore, it is to be appreciated that the insulator 118 can be formed of one piece or multiple pieces. Additionally, the insulator 118 can be formed of the same non-conductive material or different non-conductive materials.

As best shown in FIGS. 6 and 7, the first and second supports 96, 102 can each include a plurality of sleeves 120. Each of the sleeves 120 are disposed about respective first and second connectors 98, 104 to attach the first connectors 98 to the first support 96 to further define the first bundle 100 and to attach the second connectors 104 to the second support 102 to further define the second bundle 106. Therefore, the first and second connectors 98, 104 are spaced from the platform 26. In other words, the sleeves 120 are disposed between the platform 26 and respective first and second connectors 98, 104.

Referring to FIG. 6, the sleeves 120 of the first bundle 100 are disposed in respective first apertures 30 such that a first part 122 of the first connectors 98 are exposed to the first cavity 22 and a second part 124 of the first connectors 98 are exposed to the second cavity 24. More specifically, the sleeves 120 of the first bundle 100 are disposed in respective first apertures 30 such that the first part 122 of the first connectors 98 are exposed to the first cavity 22 to engage respective first strips 108 and the second part 124 of the first connectors 98 are exposed to the second cavity 24 to engage the first terminal 70. As indicated above, the cross-section of FIG. 6 is taken through the first bundle 100 and the first terminal 70 is shown in phantom lines in FIG. 6 to illustrate engagement of the second part 124 of the first connectors 98 and the first terminal 70.

Referring to FIG. 7, the sleeves 120 of the second bundle 106 are disposed in respective second apertures 34 such that a first part 126 of the second connectors 104 are exposed to the first cavity 22 and a second part 128 of the second connectors 104 are exposed to the second cavity 24. More specifically, the sleeves 120 of the second bundle 106 are disposed in respective second apertures 34 such that the first part 126 of the second connectors 104 are exposed to the first cavity 22 to engage respective second strips 114 and the second part 128 of the second connectors 104 are exposed to the second cavity 24 to engage the second terminal 72. As indicated above, the cross-section of FIG. 7 is taken through the second bundle 106 and the second terminal 72 is shown in phantom lines in FIG. 7 to illustrate engagement of the second part 128 of the second connectors 104 and the second terminal 72.

Turning to FIG. 7, the first and second supports 96, 102 can each include a cap 130 having a plurality of tabs 132. Furthermore, each of the sleeves 120 can define at least one groove 134 (see FIG. 7), with each of the tabs 132 of the cap 130 of the first and second supports 96, 102 engaging the groove 134 of respective sleeves 120 to attach the sleeves 120 to the caps 130 of the first and second supports 96, 102 to further define the first and second bundles 100, 106. The tabs 132 can bias back and forth for attaching and detaching the first and second connectors 98, 104 from the cap 130 of respective first and second supports 96, 102. In certain embodiments, a pair of tabs 132 engage respective grooves 134 of the sleeves 120. It is to be appreciated that any suitable number of tabs 132 can be utilized and the tabs 132 can be any suitable configuration and location.

The sleeves 120 and the cap 130 of the first and second supports 96, 102 can each be formed of a non-conductive material, such as a polymeric material. One suitable polymeric material is plastic. It is to be appreciated that any suitable non-conductive material can be utilized for the sleeves 120 and the cap 130 of the first and second supports 96, 102. Furthermore, it is to be appreciated that the sleeves 120 and the cap 130 of the first and second supports 96, 102 can be formed of the same non-conductive material or different non-conductive materials.

Referring to FIGS. 6 and 7, the first and second connectors 98, 104 can each include a rim 136. The rim 136 of the first connectors 98 are sandwiched between the cap 130 of first support 96 and respective sleeves 120. Similarly, the rim 136 of the second connectors 104 are sandwiched between the cap 130 of the second support 102 and respective sleeves 120. It is to be appreciated that the rim 136 can be formed of the same material as discussed above for the first and second connectors 98, 104.

Continuing with FIGS. 6 and 7, in certain embodiments, the sleeves 120 can each include a flange 138 engaging the platform 26. More specifically, the platform 26 can include a plurality of shoulders 140 extending outwardly away from the second cavity 24, with the flange 138 of each of the sleeves 120 sandwiched between the cap 130 and respective shoulders 140. In other words, the shoulders 140 extend outwardly from the platform 26 into the first cavity 22.

Referring to FIG. 6, the interface assembly 94 can also include a plurality of first seals 142 to minimize fluid being transferred between the first and second cavities 22, 24. For example, one of the first seals 142 is disposed between one of the first connectors 98 and the respective one of the sleeves 120. As another example, another one of the first seals 142 is disposed between another one of the first connectors 98 and the respective one of the sleeves 120. Similarly for the second connectors 104 and the respective sleeves 120, one of the seals 142, 144 is disposed between one of the second connectors 104 and the respective one of the sleeves 120, etc. It is to be appreciated any suitable number of first seals 142 can be utilized.

Continuing with FIGS. 6 and 7, the interface assembly 94 can further include a plurality of second seals 144 to minimize fluid being transferred between the first and second cavities 22, 24. For example, one of the second seals 144 is disposed between one of the sleeves 120 and the respective one of the shoulders 140 of the platform 26. As another example, another one of the second seals 144 is disposed between another one of the sleeves 120 and the respective one of the shoulders 140. It is to be appreciated any suitable number of second seals 144 can be utilized.

The interface assembly 94 consolidates the components that electrically connect the first and second motor/generators 64, 66 to the power inverter module 38. Specifically, the interface assembly 94 is generally disposed adjacent to the rear side 48 of the cover 42; hence, the interface assembly 94 is consolidated adjacent to the rear side 48 of the cover 42; thus condensing the amount of space utilized for the interface assembly 94.

In addition, the first and second bundles 100, 106 provide a compact sub-assembly to simplify assembly of the first and second motor/generators 64, 66 to the power inverter module 38. In other words, the first and second connectors 98, 104 are not individually inserted through the respective first and second apertures 30, 34, and are instead inserted through respective apertures 30, 34 in groups or bundles. Utilizing the first and second bundles 100, 106 reduce assembly time.

Furthermore, fasteners 146 can be utilized to secure the first and second bundles 100, 106 to the platform 26. Specifically, the cap 130 of the first and second supports 96, 102 can each define at least one first hole 148 for receiving respective fasteners 146 and the platform 26 can define a plurality of second holes 150 for receiving respective fasteners 146. Once the first and second bundles 100, 106 are attached or secured to the platform 26, the power inverter module 38 can be secured to the platform 26 such that the bus bar assembly 110 and the insulator 118 align with the first and second bundles 100, 106.

Once the power inverter module 38 is attached or secured in the first cavity 22, fasteners 152 are inserted through the bus bar assembly 110, and more specifically through the first and second strips 108, 114, and into respective first and second connectors 98, 104 to connect together the bus bar assembly 110 and the connectors 98, 104. Therefore, the fasteners 152 can couple the first and second strips 108, 114 and the first and second connectors 98, 104 respectively together such that the first strips 108 engage respective first connectors 98 to electrically connect the first inverter 80 to the first motor/generator 64 and the second strips 114 engage respective second connectors 104 to electrically connect the second inverter 82 to the second motor/generator 66. It is to be appreciated that, optionally, the fasteners 152 can couple the first and second strips 108, 114 and the first and second connectors 98, 104 respectively together such that the strips 108, 114 and the connectors 98, 104 engage respective fasteners 152, with the fasteners 152 electrically connecting the strips 108, 114 and the connectors 98, 104, and thus, the fasteners 152 electrically connect the first inverter 80 to the first motor/generator 64 and the second inverter 82 to the second motor/generator 66. The fasteners 152 can be bolts, screws or any other suitable fasteners.

It is to be appreciated that various components have been removed from FIG. 2 for illustrative purposes only, for example, fasteners for attaching or securing the lid 52 to the casing 12 have been removed, as well as the first cable harness 60 and the wire harness 90 have been removed. It is to also be appreciated that not all of the components have been exploded in FIG. 2 for illustrative purposes only, for example, the first and second connectors 98, 104 and the first and second supports 96, 102 are not exploded, i.e., the first and second bundles 100, 106 remain assembled in this Figure.

While the best modes for carrying out the disclosure have been described in detail, those familiar with the art to which this disclosure relates will recognize various alternative designs and embodiments for practicing the disclosure within the scope of the appended claims.

The invention claimed is:
1. A transmission for a vehicle, the transmission comprising:
a casing defining a first cavity and a second cavity inside the casing, with the first and second cavities spaced from each other;
a platform at least partially disposed inside the casing to separate the first and second cavities, with the platform defining a plurality of first apertures arranged together to define a first group, with the first apertures extending between the first and second cavities;
a first motor/generator disposed in the second cavity;
a power inverter module disposed in the first cavity and supported by the platform; and
an interface assembly including a first support and a plurality of first connectors attached to the first support to define a first bundle, with the first support selectively attached to the platform to position the first bundle relative to the platform such that each of the first connectors are disposed in respective ones of the first apertures of the first group, with the first connectors coupled to the power inverter module and the first motor/generator through the first apertures of the platform to electrically connect the power inverter module and the first motor/generator to each other;
wherein the interface assembly includes a bus bar assembly extending from the power inverter module, with the bus bar assembly including a first connection portion engaging the first bundle to electrically connect the power inverter module and the first motor/generator to each other.

2. A transmission as set forth in claim 1 wherein the first connection portion includes a plurality of first strips spaced from each other, with each of the first strips extending from the power inverter module and engaging respective first connectors such that the first bundle couples together the power inverter module and the first motor/generator through the first apertures and the first strips of the bus bar assembly.

3. A transmission as set forth in claim 2 wherein the first motor/generator includes a first terminal engaging the first connectors to electrically connect the first motor/generator to the power inverter module through the first terminal, the first connectors and the first strips.

4. A transmission as set forth in claim 3 wherein the first motor/generator includes a stator, with the first terminal coupled to the stator of the first motor/generator to electrically connect the stator of the first motor/generator and the power inverter module to each other.

5. A transmission as set forth in claim 1 wherein the platform defines a plurality of second apertures arranged together to define a second group spaced from the first group, with the second apertures extending between the first and second cavities.

6. A transmission as set forth in claim 5 further including a second motor/generator disposed in the second cavity, with the interface assembly including a second support being separate from the first support and a plurality of second connectors attached to the second support to define a second bundle, with the second support selectively attached to the platform to position the second bundle relative to the platform such that each of the second connectors are disposed in respective ones of the second apertures of the second group, with the second connectors coupled to the power inverter module and the second motor/generator through the second apertures of the platform to electrically connect the power inverter module and the second motor/generator to each other.

7. A transmission as set forth in claim 6 wherein the interface assembly includes a bus bar assembly extending from the power inverter module, with the bus bar assembly including a first connection portion engaging the first bundle to electrically connect the power inverter module and the first motor/generator to each other and a second connection portion engaging the second bundle to electrically connect the power inverter module and the second motor/generator to each other.

8. A transmission as set forth in claim 7 wherein the first connection portion includes a plurality of first strips spaced from each other, with each of the first strips extending from the power inverter module and engaging respective first connectors such that the first bundle couples together the power inverter module and the first motor/generator through the first apertures and the first strips of the bus bar assembly.

9. A transmission as set forth in claim 8 wherein the second connection portion includes a plurality of second strips spaced from each other and spaced from the first strips, with each of the second strips extending from the power inverter module and engaging respective second connectors such that the second bundle couples together the power inverter module and the second motor/generator through the second apertures and the second strips of the bus bar assembly.

10. A transmission as set forth in claim 9 wherein the second motor/generator includes a second terminal engaging the second connectors to electrically connect the second motor/generator to the power inverter module through the second terminal, the second connectors and the second strips.

11. A transmission as set forth in claim 10 wherein the second motor/generator includes a stator, with the second terminal coupled to the stator of the second motor/generator to electrically connect the stator of the second motor/generator and the power inverter module to each other.

12. A transmission as set forth in claim 10 wherein the first motor/generator includes a first terminal engaging the first connectors to electrically connect the first motor/generator to the power inverter module through the first terminal, the first connectors and the first strips, and wherein the first and second supports each include a plurality of sleeves, with each of the sleeves disposed about respective first and second connectors to attach the first connectors to the first support to further define the first bundle and to attach the second connectors to the second support to further define the second bundle, with the sleeves of the first bundle disposed in respective first apertures such that a first part of the first connectors are exposed to the first cavity to engage respective first strips and a second part of the first connectors are exposed to the second cavity to engage the first terminal, and with the sleeves of the second bundle disposed in respective second apertures such that a first part of the second connectors are exposed to the first cavity to engage respective second strips and a second part of the second connectors are exposed to the second cavity to engage the second terminal.

13. A transmission as set forth in claim 6 wherein the first and second supports each include a plurality of sleeves, with each of the sleeves disposed about respective first and second connectors to attach the first connectors to the first support to further define the first bundle and to attach the second connectors to the second support to further define the second bundle, with the sleeves of the first bundle disposed in respective first apertures such that a first part of the first connectors are exposed to the first cavity and a second part of the first connectors are exposed to the second cavity, and with the sleeves of the second bundle disposed in respective second apertures such that a first part of the second connectors are exposed to the first cavity and a second part of the second connectors are exposed to the second cavity.

14. A transmission for a vehicle, the transmission comprising:
   a casing defining a first cavity and a second cavity inside the casing, with the first and second cavities spaced from each other;
   a platform at least partially disposed inside the casing to separate the first and second cavities, with the platform defining a plurality of first apertures arranged together to define a first group, with the first apertures extending between the first and second cavities;
   a first motor/generator disposed in the second cavity;
   a power inverter module disposed in the first cavity and supported by the platform; and
   an interface assembly including a first support and a plurality of first connectors attached to the first support to define a first bundle, with the first support selectively attached to the platform to position the first bundle relative to the platform such that each of the first connectors are disposed in respective ones of the first apertures of the first group, with the first connectors coupled to the power inverter module and the first motor/generator through the first apertures of the platform to electrically connect the power inverter module and the first motor/generator to each other;
   wherein the platform defines a plurality of second apertures arranged together to define a second group spaced from the first group, with the second apertures extending between the first and second cavities;
   further including a second motor/generator disposed in the second cavity, with the interface assembly including a second support and a plurality of second connectors attached to the second support to define a second bundle, with the second support selectively attached to the platform to position the second bundle relative to the platform such that each of the second connectors are disposed in respective ones of the second apertures of the second group, with the second connectors coupled to the power inverter module and the second motor/generator through the second apertures of the platform to electrically connect the power inverter module and the second motor/generator to each other;
   wherein the first and second supports each include a plurality of sleeves, with each of the sleeves disposed about respective first and second connectors to attach the first connectors to the first support to further define the first bundle and to attach the second connectors to the second support to further define the second bundle, with the sleeves of the first bundle disposed in respective first apertures such that a first part of the first connectors are exposed to the first cavity and a second part of the first connectors are exposed to the second cavity, and with the sleeves of the second bundle disposed in respective second apertures such that a first part of the second connectors are exposed to the first cavity and a second part of the second connectors are exposed to the second cavity;
   wherein the first and second supports each include a cap having a plurality of tabs, and wherein each of the sleeves define a groove, with each of the tabs of the cap of the first and second supports engaging the groove of respective sleeves to attach the sleeves to the caps of the first and second supports to further define the first and second bundles.

15. A transmission as set forth in claim 14 wherein the first and second connectors each include a rim sandwiched between the cap of respective first and second supports and the sleeves of respective first and second connectors.

16. A transmission for a vehicle, the transmission comprising:
   a casing defining a first cavity and a second cavity inside the casing, with the first and second cavities spaced from each other;

a platform at least partially disposed inside the casing to separate the first and second cavities, with the platform defining a plurality of first apertures arranged together to define a first group, with the first apertures extending between the first and second cavities, and with the platform defining a plurality of second apertures arranged together to define a second group spaced from the first group, with the second apertures extending between the first and second cavities;

a first motor/generator and a second motor/generator each disposed in the second cavity;

a power inverter module disposed in the first cavity and supported by the platform; and an interface assembly including a first support and a plurality of first connectors attached to the first support to define a first bundle, with the first support selectively attached to the platform to position the first bundle relative to the platform such that each of the first connectors are disposed in respective ones of the first apertures of the first group, with the first connectors coupled to the power inverter module and the first motor/generator through the first apertures of the platform to electrically connect the power inverter module and the first motor/generator to each other;

wherein the interface assembly includes a plurality of first strips spaced from each other, with each of the first strips extending from the power inverter module and engaging respective first connectors such that the first bundle couples together the power inverter module and the first motor/generator through the first apertures and the first strips;

wherein the first motor/generator includes a first terminal engaging the first connectors to electrically connect the first motor/generator to the power inverter module through the first terminal, the first connectors and the first strips;

wherein the interface assembly includes a second support and a plurality of second connectors attached to the second support to define a second bundle, with the second support selectively attached to the platform to position the second bundle relative to the platform such that each of the second connectors are disposed in respective ones of the second apertures of the second group, with the second connectors coupled to the power inverter module and the second motor/generator through the second apertures of the platform to electrically connect the power inverter module and the second motor/generator to each other;

wherein the interface assembly includes a plurality of second strips spaced from each other and spaced from the first strips, with each of the second strips extending from the power inverter module and engaging respective second connectors such that the second bundle couples together the power inverter module and the second motor/generator through the second apertures and the second strips;

wherein the second motor/generator includes a second terminal engaging the second connectors to electrically connect the second motor/generator to the power inverter module through the second terminal, the second connectors and the second strips.

17. A transmission as set forth in claim 16 wherein the first and second supports each include a plurality of sleeves, with each of the sleeves disposed about respective first and second connectors to attach the first connectors to the first support to further define the first bundle and to attach the second connectors to the second support to further define the second bundle, with the sleeves of the first bundle disposed in respective first apertures such that a first part of the first connectors are exposed to the first cavity to engage respective first strips and a second part of the first connectors are exposed to the second cavity to engage the first terminal, and with the sleeves of the second bundle disposed in respective second apertures such that a first part of the second connectors are exposed to the first cavity to engage respective second strips and a second part of the second connectors are exposed to the second cavity to engage the second terminal.

18. A transmission as set forth in claim 17 wherein the first and second supports each include a cap having a plurality of tabs, and wherein each of the sleeves define a groove, with each of the tabs of the cap of the first and second supports engaging the groove of respective sleeves to attach the sleeves to the caps of the first and second supports to further define the first and second bundles.

19. A transmission as set forth in claim 18 wherein the first and second connectors each include a rim sandwiched between the cap of respective first and second supports and the sleeves of respective first and second connectors.

* * * * *